US011792268B2

(12) United States Patent
Sawada et al.

(10) Patent No.: US 11,792,268 B2
(45) Date of Patent: Oct. 17, 2023

(54) COMMUNICATION DEVICE, COMMUNICATION METHOD, AND RECORDING MEDIUM

(71) Applicant: Mitsubishi Electric Corporation, Tokyo (JP)

(72) Inventors: Takayuki Sawada, Tokyo (JP); Satoshi Namematsu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/795,230

(22) PCT Filed: Mar. 31, 2020

(86) PCT No.: PCT/JP2020/014932
§ 371 (c)(1),
(2) Date: Jul. 26, 2022

(87) PCT Pub. No.: WO2021/199342
PCT Pub. Date: Oct. 7, 2021

(65) Prior Publication Data
US 2023/0056654 A1 Feb. 23, 2023

(51) Int. Cl.
*H04L 67/12* (2022.01)
*G06F 16/906* (2019.01)
(52) U.S. Cl.
CPC ............ *H04L 67/12* (2013.01); *G06F 16/906* (2019.01)
(58) Field of Classification Search
CPC ............................... H04L 67/12; G06F 16/906
See application file for complete search history.

(56) References Cited

U.S. PATENT DOCUMENTS 10,535,204 B2 * 1/2020 Satou .................. G06F 17/40
11,231,705 B2 * 1/2022 Cella ................... H04L 1/0002
(Continued)

FOREIGN PATENT DOCUMENTS

JP 10-307613 A 11/1998
JP 2009169888 * 7/2009 ............. G08C 15/00
(Continued)

OTHER PUBLICATIONS

Apeterei et al., "Cluster Analysis of Half-Cycle Duration Measurements to Classify Local and Network Events", IEEE Bucharest Power Tech Conference, Jun. 28, 2009, IEEE Publishing.*
(Continued)

*Primary Examiner* — Todd L Barker
(74) *Attorney, Agent, or Firm* — XSENSUS LLP

(57) ABSTRACT

A communication device communicates, in a first cycle, with sensors connected through a network to acquire, from the sensors, measurement data measured by the sensors in data acquisition cycles longer than or equal to the first cycle and store the data in a storage. The communication device includes a grouping section to classify the sensors into groups based on the data acquisition cycles and acquire the measurement data from the classified sensors, and reclassify one of the sensors into a different group when determining that a maximum size of data to be received per first cycle exceeds a threshold for a communication band of the network, and a memory map generator to calculate a timing and an address to store the measurement data based on the data acquisition cycles and the groups resulting from the classification.

11 Claims, 18 Drawing Sheets

(56) References Cited

U.S. PATENT DOCUMENTS

| | | |
|---|---|---|
| 2017/0265188 A1 | 9/2017 | Kikuzuki et al. |
| 2018/0137691 A1* | 5/2018 | Satou .................. G06F 17/40 |
| 2018/0220458 A1* | 8/2018 | Ouchi .................. H04L 27/01 |
| 2018/0227903 A1 | 8/2018 | Uchiyama et al. |

FOREIGN PATENT DOCUMENTS

| | | | |
|---|---|---|---|
| JP | 2014-120187 A | 6/2014 | |
| JP | 2017-163259 A | 9/2017 | |
| WO | 2016/084460 A1 | 6/2016 | |
| WO | WO2016125247 | * 11/2016 | ............. H04L 12/70 |

OTHER PUBLICATIONS

Lojka et al., "Industrial Gateway for Data Acquistion And Remote Control", Acta Electrotechnica et INformatica, vol. 15, No. 2, 2015.*

Akmandor et al., "Smart, Secure, Yet Energy-Efficient, Internet-of-Things Sensors", IEEE Transactions on Multi-Scale Computing Systems, vol. 4, No. 4, Oct.-Dec. 2018.*

International Search Report and Written Opinion dated Jun. 16, 2020, received for PCT Application PCT/JP2020/014932, filed on Mar. 31, 2020, 8 pages including English Translation.

Notice of Reasons for Refusal dated Oct. 6, 2020, received for JP Application 2020-542173, 6 pages including English Translation.

Decision to Grant dated Jan. 5, 2021, received for JP Application 2020-542173, 5 pages including English Translation.

* cited by examiner

FIG.4

| | 0 | 1 | 2 | | 4 | | 7 | 8 |
|---|---|---|---|---|---|---|---|---|
| MEMORY MAP | | | | | | | | SCORE → |
| FIRST TIME | M1 (1 POINT) | M2 (1 POINT) | M10 (2 POINTS) | | M3 (3 POINTS) | | M13 (1 POINT) | |
| SECOND TIME | M1 (1 POINT) | M2 (1 POINT) | M11 (1 POINT) | UNUSED (1 POINT) | M4 (3 POINTS) | | UNUSED (1 POINT) | |
| THIRD TIME | M1 (1 POINT) | M2 (1 POINT) | M10 (2 POINTS) | | M5 (3 POINTS) | | UNUSED (1 POINT) | |
| FOURTH TIME | M1 (1 POINT) | M2 (1 POINT) | M11 (1 POINT) | UNUSED (1 POINT) | M6 (3 POINTS) | | UNUSED (1 POINT) | |
| FIFTH TIME | M1 (1 POINT) | M2 (1 POINT) | M10 (2 POINTS) | | M7 (3 POINTS) | | UNUSED (1 POINT) | |
| SIXTH TIME | M1 (1 POINT) | M2 (1 POINT) | M11 (1 POINT) | UNUSED (1 POINT) | M8 (3 POINTS) | | UNUSED (1 POINT) | |
| SEVENTH TIME | M1 (1 POINT) | M2 (1 POINT) | M10 (2 POINTS) | | M9 (3 POINTS) | | UNUSED (1 POINT) | |
| EIGHTH TIME | M1 (1 POINT) | M2 (1 POINT) | M11 (1 POINT) | UNUSED (1 POINT) | M12 (3 POINTS) | | UNUSED (1 POINT) | |
| FIRST TIME | M1 (1 POINT) | M2 (1 POINT) | M10 (2 POINTS) | | M12 (3 POINTS) | | M13 (1 POINT) | |

TC

TIME ↓

FIG.5

CONSTRAINT INFORMATION

| CONSTRAINT INFORMATION ITEM | VALUE |
|---|---|
| COMMUNICATION BAND OF SENSOR NETWORK | 1G |

FIG.6

SENSOR INFORMATION

| SENSOR ID | DATA ACQUISITION CYCLE | SCORE |
|---|---|---|
| M1 | 2.5 | 1 |
| M2 | 4.8 | 1 |
| M3 | 26.0 | 3 |
| M4 | 26.0 | 3 |
| M5 | 26.0 | 3 |
| M6 | 26.0 | 3 |
| M7 | 26.0 | 3 |
| M8 | 26.0 | 3 |
| M9 | 25.5 | 3 |
| M10 | 5.1 | 2 |
| M11 | 5.5 | 1 |
| M12 | 27.0 | 3 |
| M13 | 100.0 | 1 |

FIG.7

CONTROLLER INFORMATION

| CONTROLLER INFORMATION ITEM | VALUE |
|---|---|
| CONTROLLER CYCLE | 10 |
| NUMBER OF TIME DIVISIONS | 8 |

FIG.8

MEMORY MAP INFORMATION

| SENSOR ID | NUMBER OF TIMES | START ADDRESS | SCORE |
|---|---|---|---|
| M1 | 1 | 0 | 1 |
| M1 | 2 | 0 | 1 |
| M1 | 8 | 0 | 1 |
| M2 | 1 | 1 | 1 |
| M2 | 2 | 1 | 1 |
| M2 | 8 | 1 | 1 |
| M11 | 8 | 2 | 1 |
| M3 | 1 | 4 | 3 |
| M4 | 2 | 4 | 3 |
| M5 | 3 | 4 | 3 |
| M6 | 4 | 4 | 3 |
| M7 | 5 | 4 | 3 |
| M8 | 6 | 4 | 3 |
| M9 | 7 | 4 | 3 |
| M10 | 1 | 2 | 2 |
| M11 | 2 | 2 | 1 |
| M12 | 8 | 4 | 3 |
| M13 | 1 | 7 | 1 |

FIG.11

GROUPING CYCLE

| SENSOR | GROUPING CYCLE |
|---|---|
| M1 | 1 |
| M2 | 1 |
| M3 | 10 |
| M4 | 10 |
| M5 | 10 |
| M6 | 10 |
| M7 | 10 |
| M8 | 10 |
| M9 | 10 |
| M10 | 2 |
| M11 | 2 |
| M12 | 10 |
| M13 | 40 |

FIG.12

CORRESPONDENCE BETWEEN GROUPS AND SENSORS

| SENSOR ID | GROUP |
|---|---|
| M1 | A |
| M2 | A |
| M3 | C |
| M4 | C |
| M5 | C |
| M6 | C |
| M7 | C |
| M8 | C |
| M9 | C |
| M10 | B |
| M11 | B |
| M12 | C |
| M13 | D |

FIG.15

PRIORITY

| SENSOR | PRIORITY |
|---|---|
| M1 | 10 |
| M2 | 10 |
| M3 | 5 |
| M4 | 3 |
| M5 | 4 |
| M6 | 6 |
| M7 | 8 |
| M8 | 7 |
| M9 | 4 |
| M10 | 1 |
| M11 | 2 |
| M12 | 8 |
| M13 | 3 |

COMMUNICATION DEVICE, COMMUNICATION METHOD, AND RECORDING MEDIUM

CROSS-REFERENCE TO RELATED APPLICATION

The present application is based on PCT filing PCT/JP2020/014932, filed Mar. 31, 2020, the entire contents of which are incorporated herein by reference.

TECHNICAL FIELD

The present disclosure relates to a communication device, a communication method, and a program.

BACKGROUND ART

Factories use known systems that control devices with measurement data acquired from multiple sensors installed on the devices through a network.

In the network in such a system, a communication device that temporarily and collectively stores measurement data is connected between the sensors and a controller that analyzes the measurement data and controls the device. Such a communication device performs time division control to share the storage area with different devices at predetermined time intervals to use the limited network band and the limited storage area capacity.

CITATION LIST

Patent Literature

Patent Literature 1: Unexamined Japanese Patent Application Publication No. 2014-120187
Patent Literature 2: Unexamined Japanese Patent Application Publication No. 2017-163259

SUMMARY OF INVENTION

Technical Problem

The number of sensors connectable to a communication device or the volume of data that can be acquired from the sensors is limited by, for example, the data acquisition cycles in which the communication device acquires measurement data from the sensors, the measurement data size, the network communication band, or the storage area capacity of the communication device.

To frequently acquire measurement data from a specific sensor, the communication device also acquires measurement data from other sensors in the same cycles. Thus, the communication device frequently acquires unchanged measurement data from sensors and continues storing the same measurement data into the storage area.

Such control includes communicating or storing duplicate measurement data pieces, and thus may not efficiently use, for example, the communication band of the network or the storage area of the communication device. Such inefficient use of the storage area of the communication device may increase the number of communication devices to increase the number of sensors connected to the network, thus increasing the cost.

In response to this issue, Patent Literatures 1 and 2 each describe a system that classifies devices that use the same communication cycles into the same group based on communication cycles in which connected devices communicate with one another. Each system described in Patent Literatures 1 and 2 thus efficiently uses the storage area or the network without delay when devices with different communication cycles are connected to the system.

As described above, the systems described in Patent Literatures 1 and 2 classify devices into groups based on the communication cycles. Such classification of the devices into groups based on the communication cycles alone simply does not reflect the priority of data to be acquired by the system from each device.

Thus, devices having data with a low priority are also classified into groups based on the communication cycles, and part of the storage area is left unused without being allocated to any device.

Thus, the system described in each of Patent Literatures 1 and 2 may not maximize the total use of the storage area of the communication device.

In response to the above issue, an objective of the present disclosure is to provide a communication device, a communication method, and a program that efficiently use a storage area with the communication device that acquires measurement data from multiple sensors in different cycles.

Solution to Problem

To achieve the above objective, the communication device according to an aspect of the present disclosure is a communication device that communicates, in a first cycle, through sensors connected with a network to acquire, from each of the sensors, measurement data measured by the sensors in data acquisition cycles longer than or equal to the first cycle and to store the measurement data in a storage. The communication device includes a grouping section to classify the sensors into groups based on the data acquisition cycles, to acquire the measurement data from the sensors classified into the groups, and then to reclassify one sensor of the sensors into a different group of the groups when determining that a maximum size of data to be received through the network per first cycle exceeds a threshold for a communication band of the network, and a memory map generator to calculate, based on the data acquisition cycles and the groups resulting from the classification, a timing and an address to store the measurement data in the storage.

Advantageous Effects of Invention

The present disclosure provides the communication device, a communication method, and a program that efficiently use a storage area with the communication device that acquires measurement data from multiple sensors in different cycles.

BRIEF DESCRIPTION OF DRAWINGS

FIG. 4 is a diagram of a specific example of a memory map generated by the communication device shown in FIG. 1;

FIG. 5 is a table of a specific example of information stored in a storage in the communication device shown in FIG. 1;

FIG. 6 is a table of another specific example of information stored in the storage in the communication device shown in FIG. 1;

FIG. 7 is a table of another specific example of information stored in the storage in the communication device shown in FIG. 1;

FIG. 8 is a table of another specific example of information stored in the storage in the communication device shown in FIG. 1;

FIG. 11 is a table of another specific example of information stored in the storage in the communication device shown in FIG. 1;

FIG. 12 is a table of another specific example of information stored in the storage in the communication device shown in FIG. 1;

FIG. 15 is a table of another specific example of information stored in the storage in the communication device shown in FIG. 1;

DESCRIPTION OF EMBODIMENTS

A communication system 1 including a communication device 10 according to Embodiment 1 will be described below with reference to the drawings.

Figure 1:
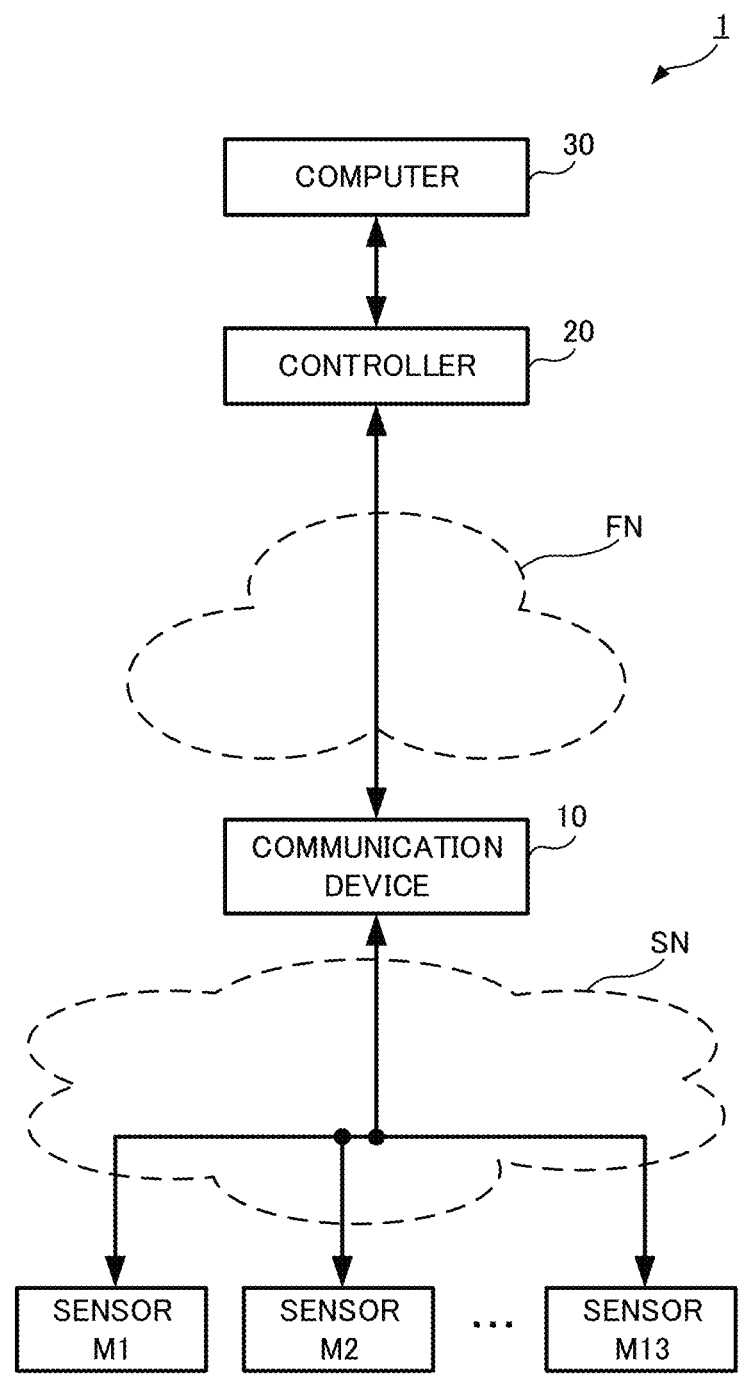
FIG. 1 is a block diagram of a communication system including a communication device according to Embodiment 1.

FIG. 1 is a schematic diagram of the communication system 1 showing the overall structure.

The communication system 1 acquires, at a factory for example, measurement data from sensors attached to parts of a device to be controlled and analyzes the acquired data to monitor or control the device.

The communication system 1 includes sensors M1 to M13 that acquire various pieces of measurement data, the communication device 10 that acquires measurement data pieces from the sensors M1 to M13, combines the acquired measurement data pieces, and communicates with other devices, a controller 20 that controls various devices including the communication device 10, and a computer 30 in which an engineering tool ET as a software program is installed to manage or set the operation of the controller 20.

More specifically, the communication device 10 collects measurement data from the sensors M1 to M13, temporarily stores the measurement data, and transforms the measurement data into a form that can be easily handled by the controller 20 to communicate with other devices.

The controller 20 collects the measurement data transformed by the communication device 10 from the communication device 10 and monitors or controls devices (not shown) based on the collected data.

The controller 20 includes, for example, a programmable logic controller (PLC). The computer 30 includes, for example, a personal computer (PC). The communication device 10 includes an embedded computer that is a bridge unit connected between the sensors M1 to M13 and the communication device 10.

The sensors M1 to M13 measure, for example, temperature, vibrations, pressure, displacement, or brightness of a measurement target. The sensors M1 to M13 are connected to the communication device 10 through a sensor network SN as a network for the sensors.

The sensors M1 to M13 each have a relatively small storage area capacity, and thus the measurement data is successively overwritten and updated. Before the measurement data is overwritten and lost, the communication device 10 acquires the data from the sensors M1 to M13 at predetermined time intervals. The predetermined time intervals are referred to as sensor data acquisition cycles. The sensors M1 to M13 use different data acquisition cycles. The sensors M1 to M13 have the respective data acquisition cycles TA1 to TA13.

The measurement data size of each of the sensors M1 to M13 varies depending on, for example, intended data accuracy or sampling frequency. Each of the devices including the sensors M1 to M13 has a score representing the size of input or output data with a numerical value. For example, a device having an input score of 5 can be connected to up to five devices each having an output score of 1. The score represents the data size. Thus, the address of the measurement data stored in a storage 12 (described below) is also represented with a score.

The communication device 10 and the controller 20 are connected through a field network FN as a network for the bridge unit.

The computer 30 is connected to the controller 20 through a network. This network may be the field network FN or a network other than the field network FN.

The components in the communication device 10 will now be described with reference to FIG. 2.

The communication device 10 includes an operation unit 11 that performs various arithmetic operations, the storage 12 that stores various items of data, a controller communication interface 13 as an interface that exchanges information with the controller 20, and a sensor communication interface 14 as an interface that exchanges information with the sensors M1 to M13.

The communication device 10 includes a buffer memory 121 as a storage area that temporarily stores measurement data acquired from the sensors M1 to M13.

The buffer memory 121 has a limited capacity. Thus, the communication device 10 cannot store all the measurement data pieces acquired from the sensors M1 to M13 into the buffer memory 121 at a time.

The communication device 10 switches, at predetermined time intervals TC, the sensors whose measurement data pieces are to be stored into the buffer memory 121. The communication device 10 acquires measurement data from the sensors M1 to M13 at sensor time intervals TC with a preset number of time divisions of, for example, eight time divisions. This predetermined time intervals TC are, for example, the same as the controller cycles TC in which the controller 20 acquires data from the communication device 10. The values of the data acquisition cycles TA1 to TA13 are greater than or equal to the value of the controller cycle TC.

The controller cycle TC is an example of a first cycle.

The communication device 10 acquires measurement data measured by the sensors M1 to M13 through the sensor network SN.

The process performed by the communication device 10 to acquire measurement data measured by, for example, the sensor M1 will be described.

When the sensor M1 detects a transmission request signal generated by the communication device 10, the sensor M1 adds, to the head and tail of a measurement data piece, information used to exchange the measurement data piece over a network, such as a header, a checksum, and an interframe gap. The sensor M1 frames the measurement data piece in accordance with a communication protocol.

The sensor M1 transmits the frame to the sensor communication interface 14 in the communication device 10 through the sensor network SN.

Figure 3:
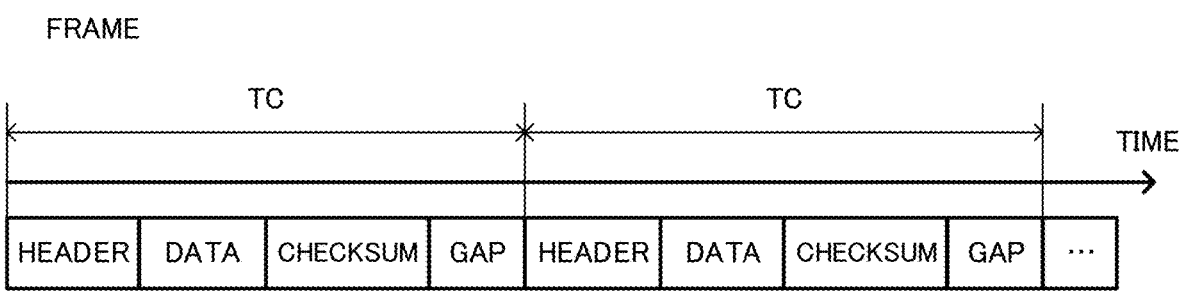
FIG. 3 is a diagram of a specific example of a frame exchanged between a sensor and the communication device shown in FIG. 1.

FIG. 3 shows an example of a frame including the measurement data acquired from the sensors M1 to M13 and exchangeable between the communication device 10 and the sensors M1 to M13.

A frame for each cycle includes a header that is a specific bit string indicating the head of the frame, actual data, a checksum added to verify whether the data is corrupted, and an interframe gap (GAP) that fills the gap between the frame and a frame for the subsequent cycle.

In this example, the measurement data measured by the sensor M1 within the controller cycle TC is contained in the frame for one cycle.

When the sensors M2, M3, and M13 transmit measurement data at the same time intervals TC as the sensor M1, a network device (not shown) combines the measurement data pieces transmitted by the sensors M1, M2, M3 and M13 into one frame and transmits the frame to the communication device 10.

For ease of understanding, the example described below does not include, for example, the combining of measurement data pieces and division of the frame, and also eliminates the additional information.

The communication device 10 determines the address of the buffer memory 121 into which the measurement data acquired from each of the sensors M1 to M13 is to be stored based on information such as the controller cycle TC, the data acquisition cycles TA1 to TA13 of the sensors M1 to M13, and the data size.

Data pieces from different sensors are stored at different addresses of the buffer memory 121, and are also stored at the same address at different timings. Information including the address and the timing to store the measurement data acquired from each of the sensors M1 to M13 is hereafter referred to as a memory map of the buffer memory 121.

FIG. 4 is a diagram of an example visualized memory map.

The horizontal axis indicates the address, and an offset from the reference address of the buffer memory 121 represents the score.

The vertical axis indicates time.

Labels showing, for example, the first time or the second time to the left of the vertical axis indicate the timing at which the memory map is updated. The timings are at equal time intervals TC.

In the example shown in FIG. 4, the buffer memory 121 is controlled by eight time divisions. Thus, the sensor allocation of the ninth memory map becomes the same as that of the first memory map. Thus, the eighth memory map is followed by the first memory map.

The rectangles in the storage area of the buffer memory 121 indicate areas allocated to the sensors M1 to M13. The horizontal position of each rectangle indicates the address of the allocated area, and the width of the rectangle indicates the size of the allocated area.

The shaded rectangles indicate unused areas not allocated to any sensor. For the second memory map, for example, the shaded rectangles indicate a portion with the score of 1 from the address 3 and a portion with the score of 1 from the address 7, and the addresses corresponding to these rectangles indicate unused areas not allocated to any sensor.

The controller 20 accesses the communication device 10 at predetermined time intervals TC to acquire information stored in the buffer memory 121.

When detecting a transmission request signal from the controller 20, the communication device 10 may transmit, for example, information about the acquisition cycle of each of the sensors M1 to M13 and the communication band of the sensor network SN in addition to the data acquired from each of the sensors M1 to M13.

The controller communication interface 13 and the sensor communication interface 14 may be the same communication interface.

The operation unit 11 in the communication device 10 will be described in detail by referring back to FIG. 2.

The operation unit 11 performs various arithmetic operations described later. The operation unit 11 includes a system information manager 111 that manages system information described later, a grouping section 112 that classifies the sensors M1 to M13 into multiple groups, a memory map generator 113 that generates a memory map in accordance with the classification, a constraint determiner 114 that determines whether the memory map satisfies a constraint, and a memory map manager 115 that manages information about the generated memory map.

Referring back to FIG. 2, the storage 12 in the communication device 10 will be described in detail.

The storage 12 includes the buffer memory 121 that temporarily stores data acquired from the sensors M1 to M13, a system information storage 122 that stores the system information described later, and a memory map storage 123 that stores information about a data-write start address of each sensor and the size.

The system information is information about the overall communication device 10 as a system, and includes input information that is input by the system information manager 111 and output information that is output by the system information manager 111.

The input information roughly includes constraint information indicating a constraint on information processing caused by the performance or the specifications of a network or the communication device 10 and sensor information indicating the performance of each sensor.

FIG. 5 shows a specific example of the constraint information stored in the system information storage 122.

The constraint information includes information about the communication band of the sensor network SN.

FIG. 6 shows a specific example of the sensor information stored in the system information storage 122.

The sensor information includes an identifier (ID), the value of the data acquisition cycle, and the score of each sensor.

The output information is output from the communication device 10, and roughly includes controller information indicating a constraint on information processing caused by the performance or the specifications of the controller and memory map information indicating allocation of areas in the buffer memory 121 to the sensors.

FIG. 7 shows a specific example of the controller information stored in the system information storage 122.

The controller information includes information about the controller cycle and information about the number of time divisions.

FIG. 8 shows a specific example of the memory map information stored in the system information storage 122.

The memory map information includes the identifier (ID) of each sensor, the number of times of allocation to each sensor, the start address in the buffer memory 121, and the score of the area used in the buffer memory 121.

Figure 9:
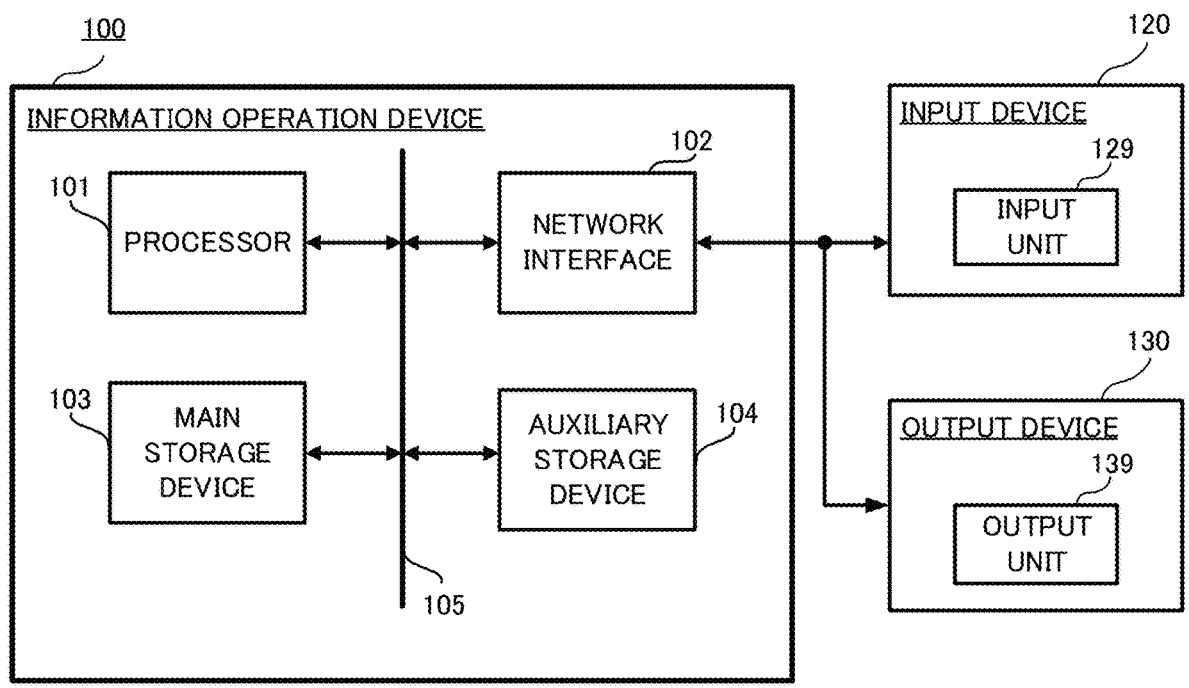
FIG. 9 is a diagram of the communication device, a controller, and a computer shown in FIG. 1 showing the hardware structure.

FIG. 9 is a hardware block diagram of an information operation device 100 as an example hardware configuration that implements the communication device 10, the controller 20, and the computer 30.

The information operation device 100 includes a processor 101 that performs various arithmetic operations described later, a network interface (IF) 102 that communicates with other devices including an input device 120 and an output device 130, a main storage device 103 that temporarily stores information such as a dynamic random access memory (DRAM) or a static random access memory (SRAM), an auxiliary storage device 104 that permanently stores information such as a hard disk drive (HDD) or a solid state drive (SSD), and a bus 105 as a path for information exchanged between the processor 101, the network interface 102, the main storage device 103, and the auxiliary storage device 104.

Figure 2:
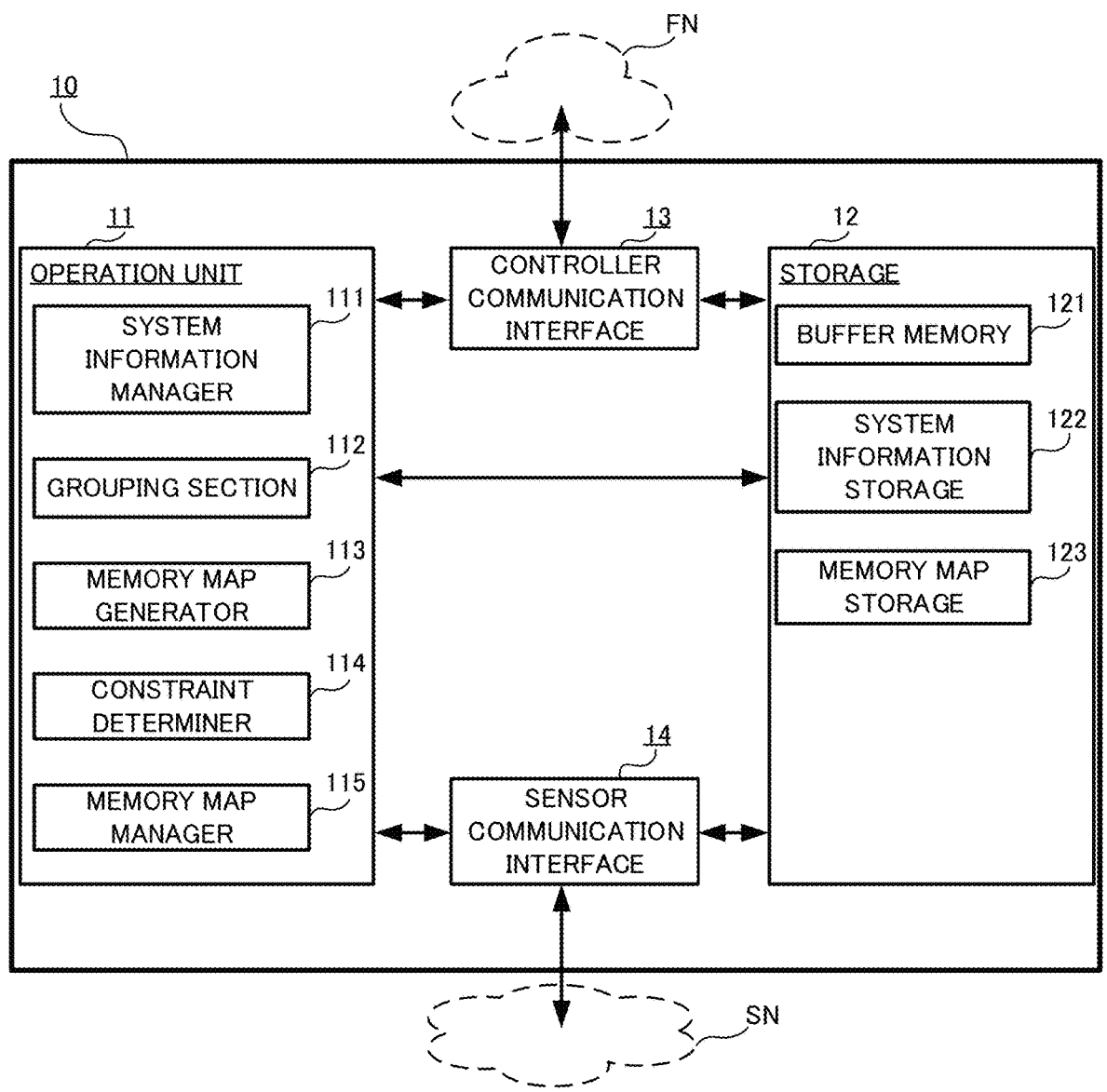
FIG. 2 is a detailed block diagram of the communication device shown in FIG. 1.

The processor 101 is an example of hardware that implements the operation unit 11 shown in FIG. 2. The network interface 102 is an example of hardware that implements the controller communication interface 13 and the sensor communication interface 14 shown in FIG. 2. The main storage device 103 and the auxiliary storage device 104 are examples of hardware that implements the storage 12 shown in FIG. 2.

The input device 120 receives inputs of external data. The input device 120 includes, for example, a human interface device such as a mouse, a keyboard, a touchscreen, and a microphone. The input device 120 includes an input unit 129 that detects, for example, the state of buttons or keys to input information.

The input device 120 may be a reception interface that detects signals transmitted from other devices, such as a parallel or serial bus.

The output device 130 is an information output device that displays various items of information to a user, and includes, for example, a liquid crystal display, a cathode-ray tube (CRT) display, or an organic electro luminescent (EL) display. The output device 130 includes, for example, a plotter or a printer that prints information in the form of, for example, text or an image. The output device 130 includes an output unit 139 that outputs information from, for example, the display or the printer.

The process of generating a memory map with the above communication device 10 will be described with reference to the flowchart in FIG. 10.

The system information manager 111 acquires the data acquisition cycles TA1 to TA13 of the sensors M1 to M13 (step S101).

For example, to acquire the data acquisition cycle TA1 of the sensor M1, the system information manager 111 transmits a command to the sensor M1 as a sensor unit through, for example, the sensor communication interface 14, and acquires the data acquisition cycle TA1 from the sensor M1.

When the computer 30 stores the data acquisition cycle TA1 of the sensor M1, the system information manager 111 may acquire the data acquisition cycle TA1 of the sensor M1 from the computer 30 through the controller communication interface 13.

As shown in FIG. 6, different sensors have different data acquisition cycles TA1 to TA13. For example, data acquisition cycles TA1 to TA13 range from 2.5 to 100.0 ms.

Referring back to FIG. 10, the system information manager 111 determines the controller cycle TC of the controller 20 based on the data acquisition cycles TA1 to TA13 acquired in step S101 (step S102).

For example, the system information manager 111 selects the data acquisition cycle of a most frequently updated sensor, or more specifically, a sensor with the shortest data acquisition cycle, and determines the selected data acquisition cycle as the controller cycle TC.

In the example shown in FIG. 6, the sensor M1 has the shortest data acquisition cycle TA1 of 2.5 ms of the data acquisition cycles TA1 to TA13 of the sensors M1 to M13. Thus, the system information manager 111 determines the controller cycle TC to be 2.5 ms.

Figure 10:
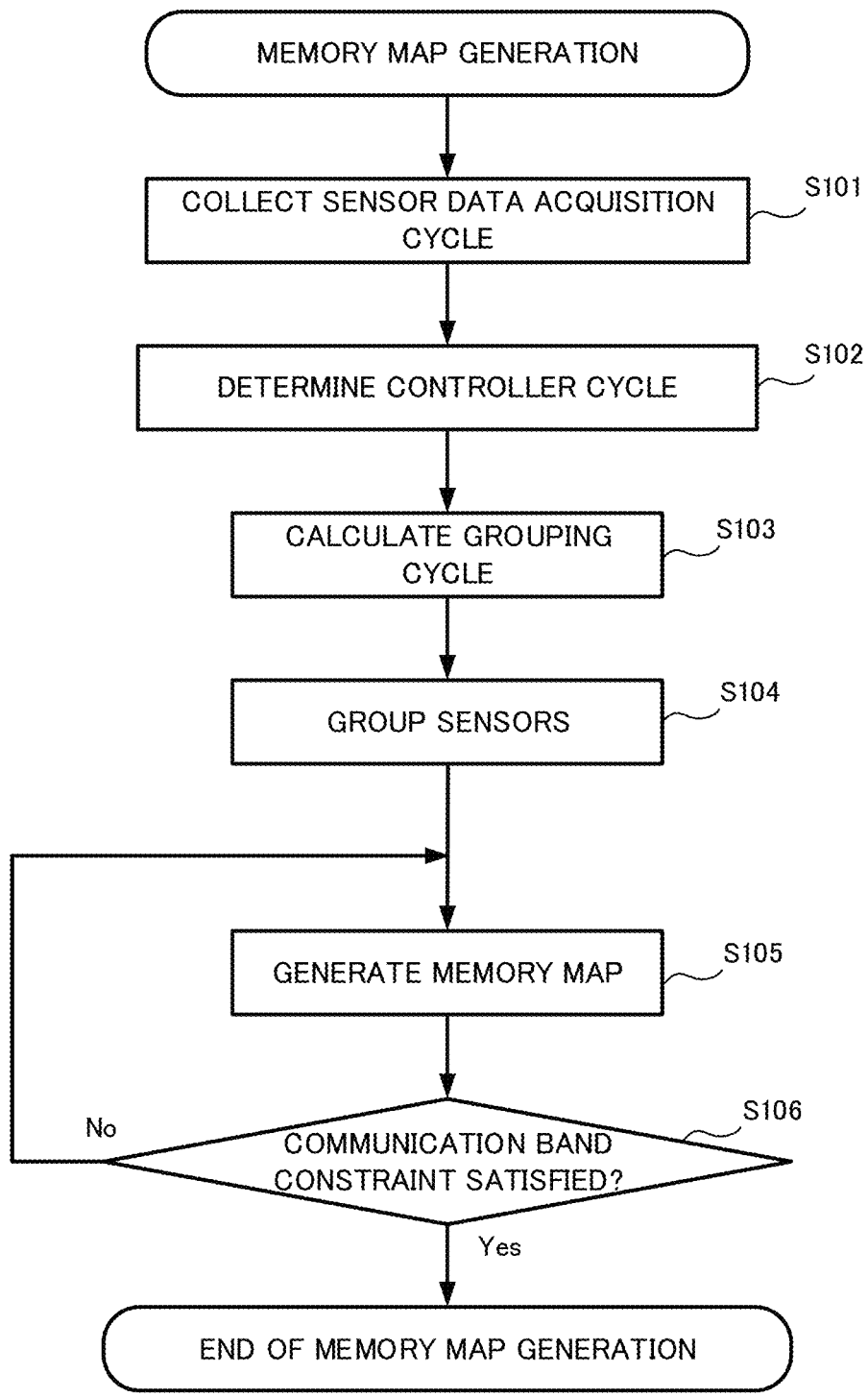
FIG. 10 is a flowchart showing a process of generating the memory map performed by the communication device shown in FIG. 1.

Referring back to the flowchart in FIG. 10, the grouping section 112 calculates a grouping cycle that is a numerical value used as a reference for the subsequent grouping based on the information acquired or determined by the system information manager 111 (step S103).

Grouping cycles TG1 to TG13 are calculated as the integer ratio of the data acquisition cycles TA1 to TA13 of the sensors M1 to M13 to the controller cycle TC as a reference.

For example, the grouping cycle TG3 of the sensor M3 is calculated in the manner described below.

The shortest cycle of the data acquisition cycles TA1 to TA13 of the sensors M1 to M13 is the data acquisition cycle TA1 of the sensor M1 of 2.5 ms, as described above.

The data acquisition cycle TA3 of the sensor M3 is 26.0 ms.

The grouping section 112 calculates 26.0/2.5 (=10.4) based on the data acquisition cycles TA1 and TA3, and rounds down the calculated ratio to an integer to acquire the grouping cycle TG3 as an integer value of 10.

In this manner, the grouping section 112 calculates the grouping cycles TG1 to TG13 of all the sensors M1 to M13.

FIG. 11 shows a specific example of the calculated grouping cycles TG1 to TG13 of the sensors M1 to M13.

Subsequently, the grouping section 112 classifies the sensors M1 to M13 into multiple groups including a group A, a group B, a group C, and a group D based on the grouping cycles TG1 to TG13 calculated in step S103 (step S104).

Classifying the sensors is hereafter referred to as grouping.

Step S104 is an example of classifying.

Known typical grouping will be described first.

In the example shown in FIG. 11, each of the grouping cycles TG1 to TG13 is one of 1, 2, 10, and 40.

Thus, the grouping section 112 first classifies each of the sensors M1 to M13 into one of four groups.

The grouping section 112 then classifies the sensors M1 to M13 in ascending order of the grouping cycles TG1 to TG13 into the groups A to D in order from the shortest cycle of the grouping cycles TG1 to TG13. For example, the grouping section 112 classifies the sensors M1 and M2 with the shortest grouping cycle of 1 into the group A, the sensors M10 and M11 with the grouping cycle of 2 into the group B, the sensors M3 to M9 and M12 with the grouping cycle of 10 into the group C, and the sensor M13 with the longest grouping cycle of 40 into the group D.

Thus, the sensors M1 to M13 are each classified into one of the groups A to D.

The condition for the known typical grouping described above is referred to as a first condition. FIG. 12 shows the correspondence between the sensors and the groups determined in accordance with the first condition.

The memory map generator 113 generates a memory map in accordance with the groups resulting from the classification. Referring back to the flowchart in FIG. 10, the process of generating a memory map will be described.

The memory map generator 113 generates a memory map in accordance with the groups resulting from the classification performed by the grouping section 112 in step S104 (step S105).

Step S105 is an example of calculating.

The memory map generator 113 generates a memory map based on the capacity of the buffer memory 121, the score of each of the sensors M1 to M13, and the groups of the sensors M1 to M13.

Due to the limited capacity of the buffer memory 121, for example, the data score that can be accumulated at a time is 8 or less, and the number of time divisions of the buffer memory is nine or less.

The memory map generator 113 allocates each area to at least one sensor from each group. When multiple sensors are classified into one group, the memory map generator 113 sorts the sensors in each group in ascending order of the sensor identification information.

Figure 13:
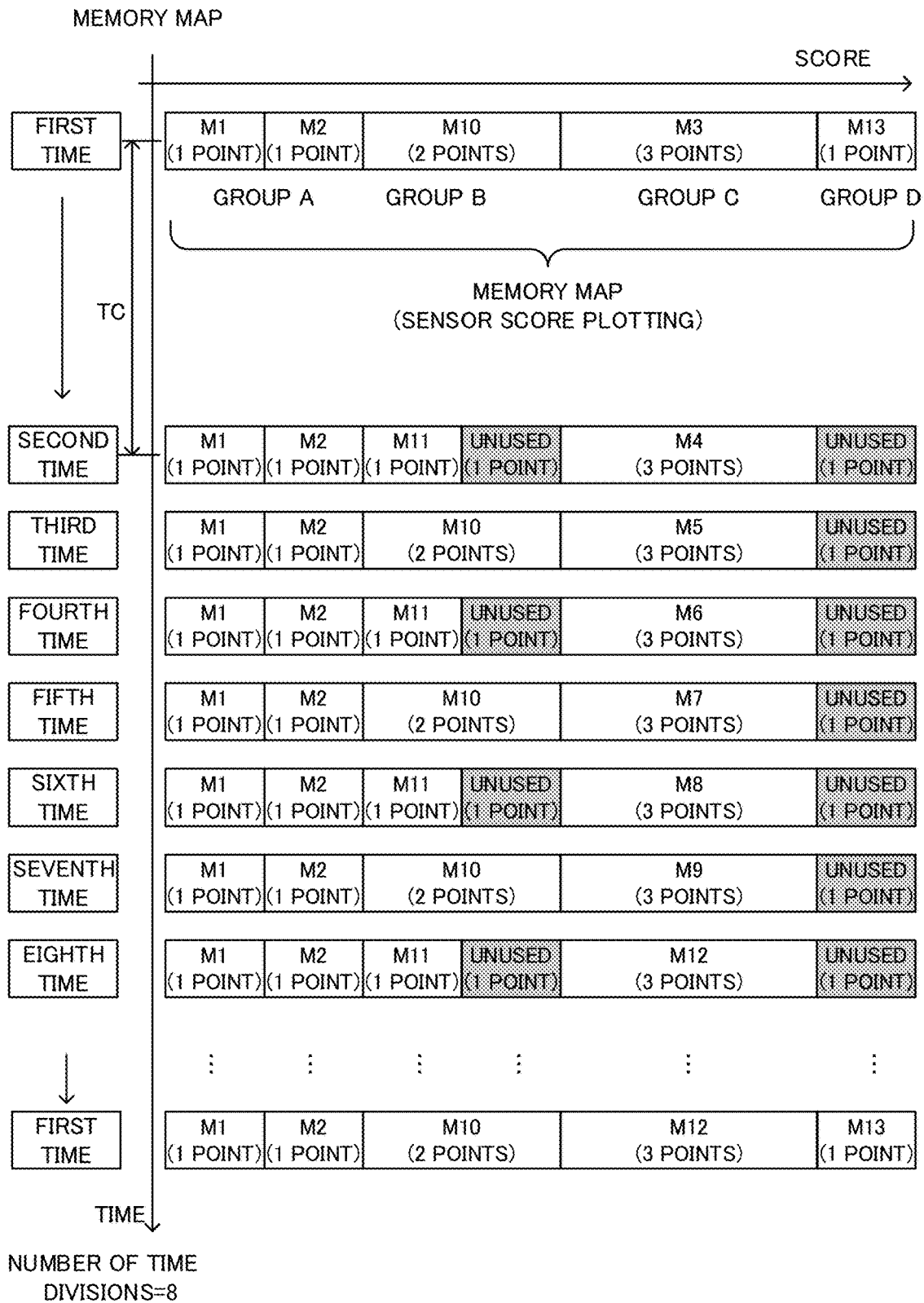
FIG. 13 is a diagram of another specific example of the memory map generated by the communication device shown in FIG. 1.

FIG. 13 shows an example of a memory map generated with such a criterion.

Referring to FIG. 13, in the first accumulation, the sensors M1 and M2 from the group A, the sensor M10 from the group B, the sensor M3 from the group C, and the sensor M13 from the group D are plotted.

In the second accumulation, the sensors M1 and M2 from the group A, the sensor M11 from the group B, and the sensor M4 from the group C are plotted. The sensor M11 has a less score than the sensor M10, and thus the area for the group B has an unused area. The sensor M13 is not to be updated, and the group D has no sensor other than the sensor M13. Thus, no sensor from the group D is plotted.

Referring back to the flowchart in FIG. 10, the subsequent processes will now be described.

After the memory map is generated by the memory map generator 113, the constraint determiner 114 determines whether the generated memory map satisfies the constraint on the communication band of the field network FN (step S106). When the constraint determiner 114 determines that the memory map does not satisfy the constraint (No in step S106), the processing returns to step S105, and the memory map is regenerated with a different criterion.

The constraint in this case is whether the memory map exceeds a threshold for the communication band of the sensor network SN when the controller 20 communicates with the communication device 10 in accordance with the memory map generated in step S105.

The threshold for the communication band of the sensor network SN is, for example, part of the communication band of the sensor network SN assigned to acquiring of the measurement data, and calculated in the manner described below.

As illustrated in FIG. 5, the value of the communication band of the sensor network SN is stored in the system information storage 122 as constraint information.

The threshold for the communication band of the sensor network SN is calculated from the value of the communication band stored in the system information storage 122, the value of the controller cycle TC, and a value preset as a ratio at which the communication band may be used by the communication device 10.

For example, the value of the communication band of the sensor network SN is 1 Gb per second, the controller cycle TC is 2.5 ms, and the part of the communication band assigned to acquiring of the measurement data with the communication device 10 is 0.1% of the entire communication band of the sensor network SN.

In this case, the value of the communication band of the sensor network SN is 2500 bits per controller cycle TC.

In the memory map shown in FIG. 13, for example, in the first accumulation, the total score of 8 of measurement data pieces of the sensors M1, M2, M10, M3, and M13 are exchanged through the sensor network SN, and in the second accumulation, the total score of 6 of measurement data pieces of the sensors M1, M2, M11, and M4 are exchanged through the sensor network SN.

In other words, this memory map allows exchange of data pieces up to the score of 8 in each cycle TC. When the data size including the measurement data pieces with the maximum score of 8 received in each time TC exceeds the threshold for the communication band of the sensor network SN with the added data such as the header and the checksum, the constraint determiner 114 determines that the memory map does not satisfy the constraint.

For example, when the maximum size of the measurement data is 256 bits, and the added data value other than the measurement data is 24 bits, the frame size including the measurement data is 280 bits at maximum.

For eight divisions, eight frames are transmitted and received per controller cycle TC. Thus, data of 2240 bits is exchanged through the sensor network SN per controller cycle TC.

As described above, the threshold for the communication band of the sensor network SN is 2500 bits. The constraint determiner 114 compares these values, and determines that the size of data including the measurement data does not exceed the threshold for the communication band.

The threshold for the communication band of the sensor network SN is an example of a communication band threshold.

In the flowchart in FIG. 10, when the constraint determiner 114 determines that the memory map satisfies the constraint (Yes in step S106), the memory map manager 115 provide the memory map information shown in FIG. 8 to the controller 20 through the controller communication interface 13.

Based on the memory map information provided from the memory map manager 115 in the communication device 10, the controller 20 acquiring measurement data in the buffer memory 121 in the communication device 10 determines the sensor from which the measurement data has been acquired.

Instead of providing the memory map information, for example, the memory map manager 115 may provide a notification simply indicting that the memory map information is updated to the controller 20. In another case, without any notification, the controller 20 may monitor the communication device 10 to detect the update of the memory map and acquire the memory map information.

When the constraint determiner 114 determines that the memory map does not satisfy the constraint (No in step S106), the memory map is reviewed (step S105).

With the method in accordance with the first condition, all the groups including the groups A to D are plotted in the memory map. However, when a few sensors having a long cycle are in a certain group, the area allocated to the group is left unused, and the unused area reduces efficiency.

To use the unused area, grouping may be performed again with a different condition. This condition is hereafter referred to as a second condition.

More specifically, in the memory map shown in FIG. 13, the area for the group D at the address immediately after the area for the group C is unused in the second and subsequent mapping when the D group includes the sensor M13 alone with the longer data acquisition cycle TA13 than the sensors in the other groups.

Thus, the grouping section 112 regenerates a memory map in accordance with the criterion described below.

The grouping section 112 first calculates the number of sensors included in each of all the groups.

The grouping section 112 then selects the group including the fewest sensors.

The grouping section 112 marks unused areas in the areas for the groups other than the group including the fewest sensors.

The grouping section 112 determines whether all the sensors in the group including the fewest sensors can be moved to the marked unused areas.

In the example shown in FIG. 12, two sensors are included in the group A, two sensors are included in the group B, eight sensors included in the group C, and one sensor is included in the group D. The group D includes the fewest sensors.

The unused areas in the areas for the groups A, B, and C shown in FIG. 13 are the areas in the group B for the score of 1 in even-numbered memory maps.

Thus, the grouping section 112 marks these areas as unused areas.

The grouping section 112 determines whether the sensor M13 in the group D with the longest grouping cycle can be moved. The single sensor M13 included in the group D has the score of 1, and all the marked areas are large enough to accommodate the data score of 1 or greater.

Thus, the grouping section 112 determines that the sensor M13 can be moved to the area of the group B in the second memory map.

Figure 14:
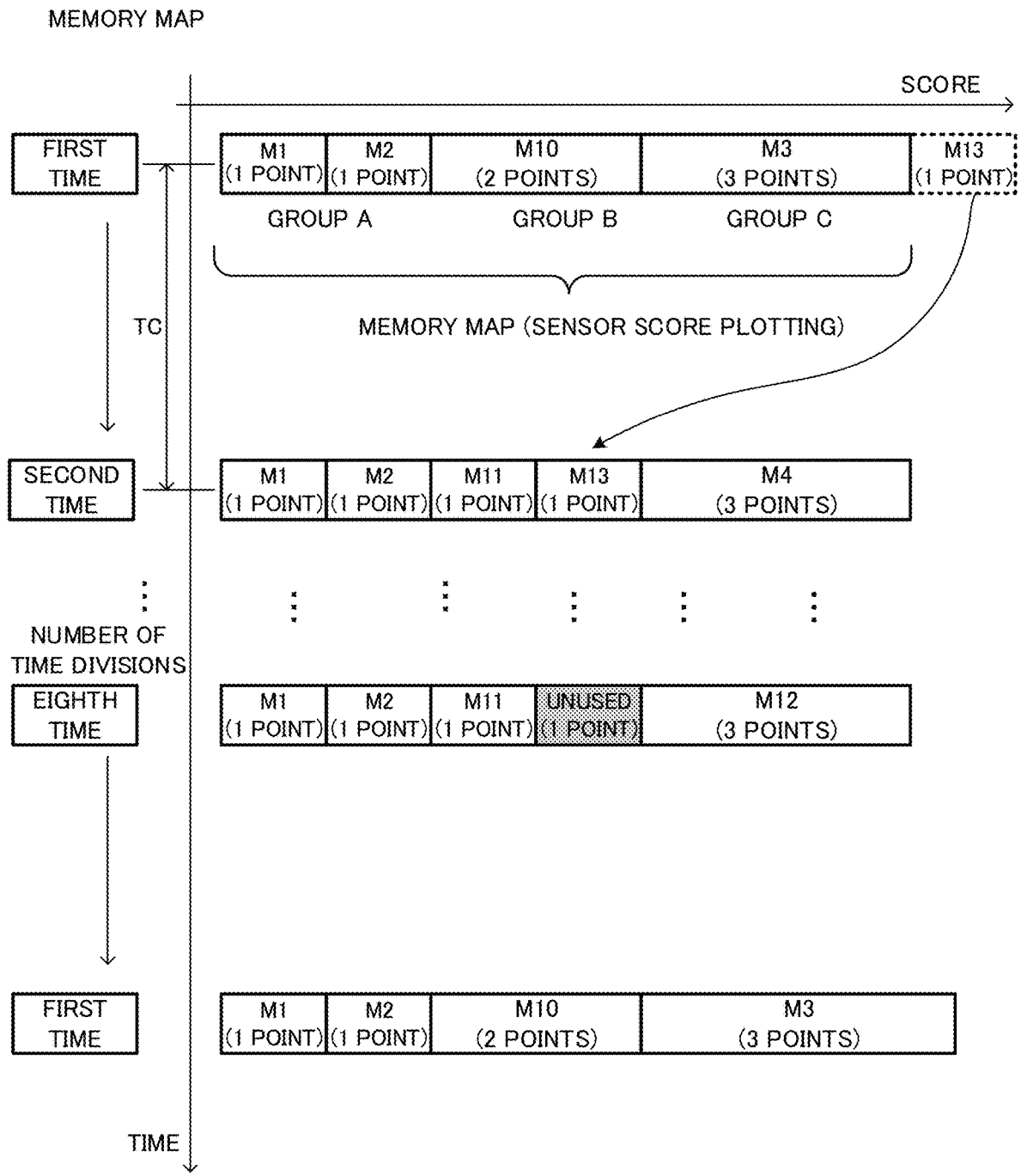
FIG. 14 is a diagram of another specific example of the memory map generated by the communication device shown in FIG. 1.

As indicated with an arrow in FIG. 14, in accordance with the determination, the grouping section 112 moves the sensor M13 at the start address 7 in the first memory map to the start address 3 in the second memory map.

The memory map generator 113 regenerates the memory map in accordance with the groups reclassified by the grouping section 112 (step S105).

After the regeneration of a memory map, the constraint determiner 114 determines again whether the memory map satisfies the constraint on the communication band (step S106).

In the memory map regenerated in accordance with the second condition, data transferred in one accumulation has the score of 7 at maximum. Compared with the memory map generated in accordance with the first condition that uses the score of 8 at maximum, the regenerated memory map can reduce the maximum value of data transferred in one accumulation.

The sensor moved to an unused area may be selected from the sensors included in preselected group under the second condition.

When the grouping in accordance with the second condition described above does not satisfy the constraint, the grouping section 112 may further perform grouping in accordance with still another condition.

An example of grouping in accordance with still another condition as a third condition will be described below.

The third condition is to extend the data acquisition cycle of a sensor in accordance with the priority of acquiring measurement data in each data acquisition cycle.

The priorities are preassigned to the sensors M1 to M13. These priorities are stored in the system information storage 122. The priorities are set by the system information manager 111 and stored in the system information storage 122.

For example, as shown in FIG. 15, the priorities are represented by integer values from 1 to 10, and a higher value represents a higher priority.

The system information manager 111 acquires the priorities of the sensors M1 to M13 from the system information storage 122.

Subsequently, the grouping section 112 compares a predetermined threshold, for example, 3, with the priorities of the sensors M1 to M13 acquired by the system information manager 111, and determines one or more sensors having the priority below the threshold as one or more sensors with a low priority.

In the example shown in FIG. 15, the grouping section 112 determines the sensor M10 with the priority of 1 that is smaller than the threshold of 3 and the sensor M11 with the priority of 2 that is smaller than the threshold of 3 as sensors with a low priority, and extends the data acquisition cycles TA10 and TA11 of these sensors M10 and M11. For example, the grouping section 112 updates each of the data acquisition cycles TA10 and TA11 with double the data acquisition cycles TA10 and TA11.

When two or more sensors are determined as the low-priority sensors based on a predetermined threshold, the grouping section 112 may lower the threshold by a fixed value, and may perform the determination again. When no sensors are determined as low-priority sensors based on a predetermined threshold, the grouping section 112 may raise the threshold by a fixed value, and may perform the determination again.

The allocation of the sensors M10 and M11 determined as low-priority sensors is changed in the manner described below based on, for example, whether any unused area is in the buffer memory 121, the size of the unused area, the refresh cycle of the buffer memory 121, the controller cycle, and an extendable data acquisition cycle.

The grouping section 112 first determines whether the low-priority sensor can be moved to an unused area.

When the low-priority sensor is not determined to be movable to an unused area, the grouping section 112 increases the number of time divisions by one, and moves the low-priority sensor to the last slot the increased time divisions. The grouping section 112 then determines whether each sensor not determined as a low-priority sensor can be plotted with the sensor acquisition cycle condition being satisfied.

When all such sensors are determined to be movable, the grouping section 112 changes sensor allocation.

Figure 16:
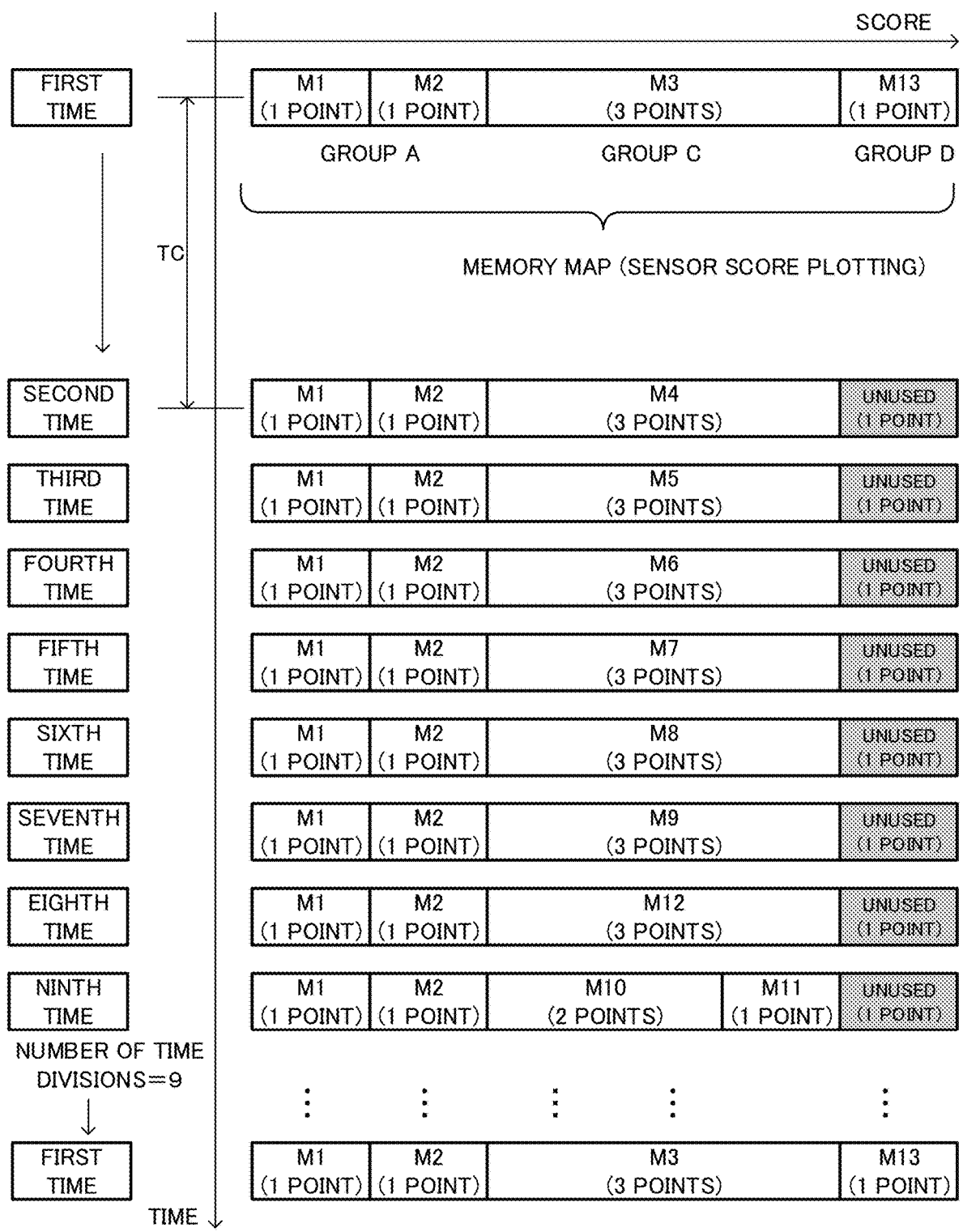
FIG. 16 is a diagram of another specific example of the memory map generated by the communication device shown in FIG. 1.

Referring to FIG. 16, the movement process in accordance with the second condition will be described.

The sensor M10 has the score of 2, whereas all the unused areas have the score of 1. Thus, the grouping section 112 determines that the low-priority sensor cannot be moved to the unused areas.

The number of time divisions cannot be maintained. The grouping section 112 thus increases the number of time divisions from eight to nine.

In the ninth memory map, the grouping section 112 moves the sensors M10 and M11 to the areas allocated to the group C with a long grouping cycle. The sensors other than the sensors M10 and M11 include the sensors M1 and M2 having the grouping cycles TG1 and TG2 of 1 and cannot satisfy the constraint of the data acquisition cycle unless plotted in the ninth memory map. Thus, the grouping section 112 determines whether these sensors M1 and M2 can be plotted in the ninth memory map.

The ninth memory map has unused areas at the start addresses 0 and 5 with the score of 3 in total. Thus, the grouping section 112 determines that these sensors M1 and M2 can be plotted in these unused areas.

In the memory map in accordance with this criterion, although the number of time divisions is increased from eight shown in FIG. 14 to nine shown in FIG. 16, the total score in one accumulation cycle can be reduced from 53 shown in FIGS. 14 to 46 shown in FIG. 16. Thus, extending the data acquisition cycle of any sensor can increase efficiency.

The sensor that allows extension of the data acquisition cycle may be selected from a user program or may be set by a user.

The communication device 10 performs grouping in accordance with the first condition, and performs, when the memory map acquired after the grouping in accordance with the first condition does not satisfy the constraint, grouping in accordance with the second condition. In some embodiments, the communication device 10 may perform grouping in accordance with the second condition without determining whether the memory map acquired after the grouping in accordance with the first condition satisfies the constraint, or when the memory map satisfies the constraint. Additionally, the communication device 10 may perform grouping in accordance with the third condition without determining whether the memory map acquired after the grouping in accordance with the second condition satisfies the constraint, or when the memory map satisfies the constraint. In another example, the communication device 10 may perform grouping in accordance with the third condition without the grouping in accordance with the second condition. The communication device 10 may perform grouping in accordance with the third condition, and may perform, when the acquired memory map does not satisfy the constraint, grouping in accordance with the second condition.

The above functions of the information operation device 100 in the communication device 10 may be implemented by a device other than the communication device 10.

Figure 17:
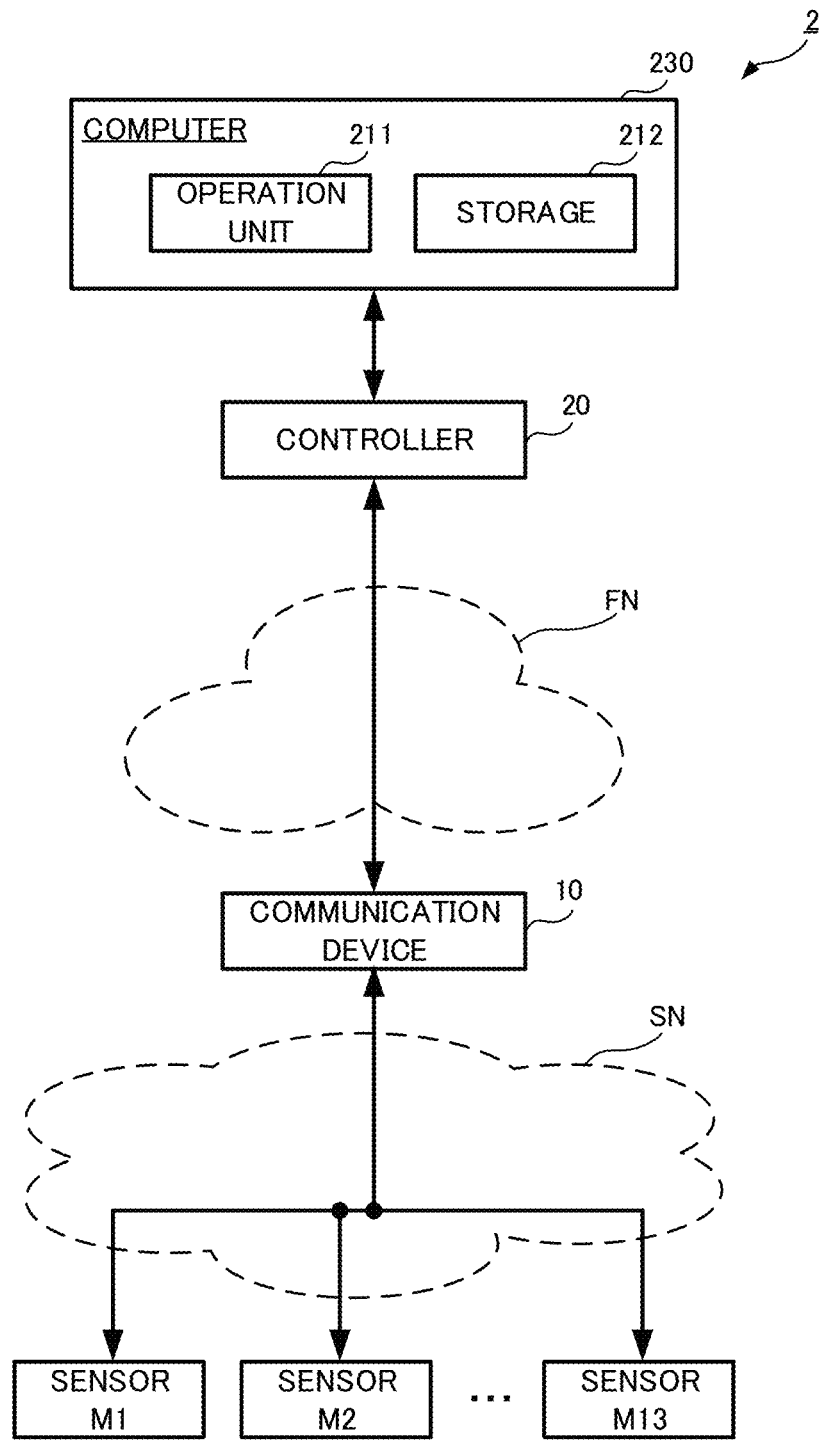
FIG. 17 is a block diagram of a communication system including a communication device according to Embodiment 2.

Referring to FIG. 17, a communication system 2 including a computer 230 according to Embodiment 2 that implements the functions of the information operation device 100 with installed software will be described.

Differences from Embodiment 1 will be described below.

Figure 18:
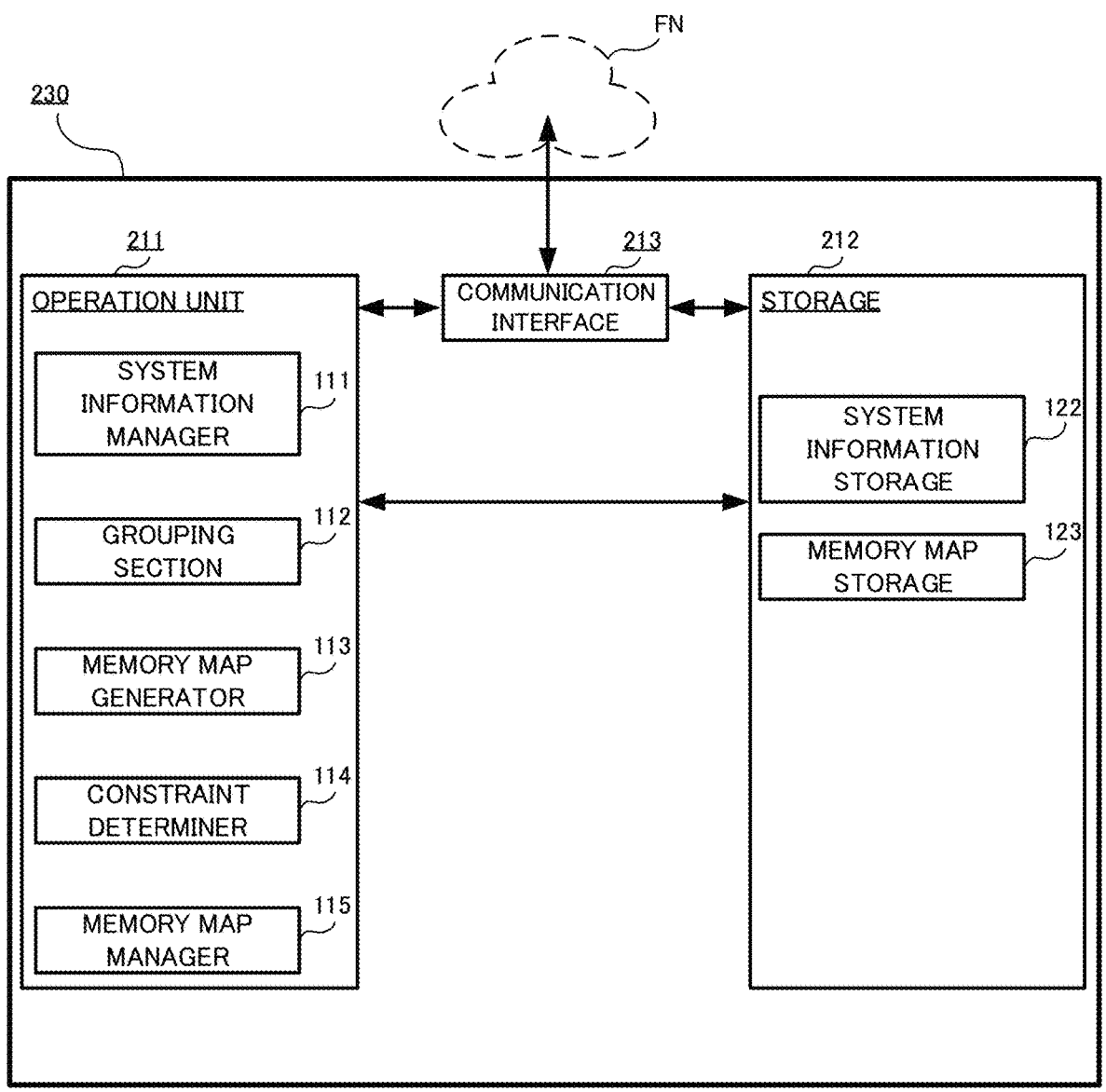
FIG. 18 is a detained block diagram of the communication device shown in FIG. 17.

As shown FIG. 18, similarly to the communication device 10, an operation unit 211 in the computer 230 includes a system information manager 111, a grouping section 112, a memory map generator 113, a constraint determiner 114, and a memory map manager 115.

Similarly to the communication device 10, a storage 212 in the computer 230 includes a system information storage 122 and a memory map storage 123.

The system information manager 111 in the computer 230 performs steps S101 to S105 shown in FIG. 10 based on system information stored in the system information storage 122.

When the system information storage 122 does not store system information to be used, the system information manager 111 may perform steps S101 to S105 shown in FIG. 10 based on information input through the input device 120 by a user.

When connected to the communication device 10 or the controller 20 through a network, the computer 230 may provide the system information and the memory map information to the controller 20 or the communication device 10.

When connected to the communication device 10 or the controller 20, the computer 230 may transmit the information stored in the storage 212 to the communication device 10 or the controller 20.

The communication device 10 acquires the system information and the memory map information from the computer 230 through the controller 20 and the field network FN, and controls, through the sensor network SN, the buffer memory 121 that allocates areas to the sensors M1 to M13.

The computer 230 can simplify the configuration of the communication device 10. The communication device 10 may not be constantly connected to the controller 20.

Thus, the computer 230 can reduce costs.

The above data structure is a mere example, and data may have another structure, or may include data other than the above data.

The functions of the operation unit 211 and the storage 212 may be implemented by executing a program including an engineering tool ET installed in the computer 230.

In the context of the present disclosure, a non-transitory computer-readable medium may be any tangible medium that can hold or store a program to be used by an instruction execution system, equipment, or device or to be used in association with the instruction execution system, installation, or device. The non-transitory computer-readable medium may be a non-transitory computer-readable signal medium or a non-transitory computer-readable recording medium. The non-transitory computer-readable medium includes, but not limited to, an electronic, magnetic, optical, electromagnetic, infrared, or semiconductor system, installation, or device, or an appropriate combination of any two or more of these. More specific examples of the non-transitory computer-readable recording medium include electric connection with at least one wire, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage, a magnetic storage, and an appropriate combination of any two or more of these.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

| Reference Signs List | |
|---|---|
| 1, 2 | Communication system |
| 10 | Communication device |
| 11 | Operation unit |
| 12 | Storage |
| 13 | Controller communication interface |
| 14 | Sensor communication interface |
| 20 | Controller |
| 30 | Computer |
| 100 | Information operation device |
| 101 | Processor |
| 102 | Network interface |
| 103 | Main storage device |
| 104 | Auxiliary storage device |
| 105 | Bus |
| 111 | System information manager |
| 112 | Grouping section |
| 113 | Memory map generator |
| 114 | Constraint determiner |
| 115 | Memory map manager |
| 120 | Input device |
| 121 | Buffer memory |
| 122 | System information storage |
| 123 | Memory map storage |
| 129 | Input unit |
| 130 | Output device |
| 139 | Output unit |
| 211 | Operation unit |
| 212 | Storage |
| 213 | Communication interface |
| 230 | Computer |
| FN | Field network |
| M1, M2, M3, M4, M5, M6, M7, M8, M9, M10, M11, M12, M13 | Sensor |
| SN | Sensor network |
| ET | Engineering tool |
| TC | Controller cycle |

The invention claimed is:

1. A communication device that communicates, in a first cycle, with sensors connected through a network to acquire, from each of the sensors, measurement data measured by the sensors in data acquisition cycles longer than or equal to the first cycle and to store the measurement data in a storage, the communication device comprising:
a grouping section to classify the sensors into groups based on the data acquisition cycles, to acquire the measurement data from the sensors classified into the groups, and then to reclassify one sensor of the sensors into a different group of the groups when determining that a maximum size of data to be received through the network per first cycle exceeds a threshold for a communication band of the network; and
a memory map generator to calculate, based on the data acquisition cycles and the groups resulting from the classification, a timing and an address to store the measurement data in the storage.

2. The communication device according to claim 1, wherein
the grouping section classifies the sensors into the groups by the data acquisition cycles.

3. The communication device according to claim 1, wherein
the grouping section calculates a ratio of a data acquisition cycle of each of the sensors to a shortest data acquisition cycle of the data acquisition cycles of the sensors, rounds down the calculated ratio to an integer ratio, and classifies two or more sensors, among the sensors, having the same calculated integer ratio into one group of the groups.

4. The communication device according to claim 1, wherein
the grouping section classifies, among at least one sensor of the sensors included in a group of the groups having fewest classified sensors, a sensor with a longest data acquisition cycle into a different group of the groups.

5. The communication device according to claim 1, wherein
the threshold for the communication band of the network is a communication band threshold for part of the communication band of the network assigned to acquiring of the measurement data, and
the grouping section reclassifies a sensor of the sensors with a lowest priority for the communication device to acquire the measurement data in each data acquisition cycle into a different group of the groups when determining that a maximum size of the measurement data to be received by the communication device through the network per first cycle exceeds the communication band threshold.

6. A communication method to be performed by a communication device that communicates, in a first cycle, with sensors connected through a network to acquire, from each of the sensors, measurement data measured by the sensors in data acquisition cycles longer than or equal to the first cycle and stores the measurement data in a storage, the communication method comprising:
classifying, by a grouping section of the communication device, the sensors into groups based on the data acquisition cycles, acquiring the measurement data from the sensors classified into the groups, and then reclassifying one sensor of the sensors into a different group of the groups when determining that a maximum size of data to be received through the network per first cycle exceeds a threshold for a communication band of the network; and
calculating, by a memory map generator of the communication device, a timing and an address to store the measurement data in the storage based on the data acquisition cycles and the groups resulting from the classification.

7. The communication method according to claim 6, wherein
the classifying includes classifying the sensors into the groups by the data acquisition cycles.

8. The communication method according to claim 6, wherein
the classifying includes calculating a ratio of a data acquisition cycle of each of the sensors to a shortest data acquisition cycle of the data acquisition cycles of the sensors, rounding down the calculated ratio to an integer ratio, and classifying two or more sensors, among the sensors, having the same calculated integer ratio into one group of the groups.

9. The communication method according to claim 6, wherein
the classifying includes classifying, among at least one sensor of the sensors included in a group of the groups having fewest classified sensors, a sensor with a longest data acquisition cycle into a different group of the groups.

10. The communication method according to claim 6, wherein
the threshold for the communication band of the network is a communication band threshold for part of the communication band of the network assigned to acquiring of the measurement data, and the classifying includes reclassifying a sensor of the sensors with a lowest priority of acquiring the measurement data in each data acquisition cycle into a different group of the groups when determining that a maximum size of the measurement data to be received through the network per first cycle exceeds the communication band threshold.

11. A non-transitory computer-readable recording medium storing a program, the program causing a computer to implement a communication method including communicating, in a first cycle, with sensors connected through a network to acquire, from each of the sensors, measurement data measured by the sensors in data acquisition cycles longer than or equal to the first cycle and to store the measurement data in a storage, the program causing the computer to perform operations comprising:

classifying the sensors into groups based on the data acquisition cycles, acquiring the measurement data from the sensors classified into the groups, and then reclassifying one sensor of the sensors into a different group of the groups when determining that a maximum size of data to be received through the network per first cycle exceeds a threshold for a communication band of the network; and calculating a timing and an address to store the measurement data in the storage based on the data acquisition cycles and the groups resulting from the classification.

* * * * *